US008242190B2

(12) United States Patent
Sumitomo et al.

(10) Patent No.: US 8,242,190 B2
(45) Date of Patent: Aug. 14, 2012

(54) CRAYON AND PROCESS FOR PRODUCING THE SAME

(75) Inventors: Kotaro Sumitomo, Sijonawate (JP); Masamitsu Takahashi, Sijonawate (JP); Hidetoshi Fukuo, Yao (JP)

(73) Assignee: Sakura Color Products Corporation, Osaka (JP)

( * ) Notice: Subject to any disclaimer, the term of this patent is extended or adjusted under 35 U.S.C. 154(b) by 527 days.

(21) Appl. No.: 12/439,438

(22) PCT Filed: Aug. 29, 2007

(86) PCT No.: PCT/JP2007/066770
§ 371 (c)(1),
(2), (4) Date: Jul. 28, 2009

(87) PCT Pub. No.: WO2008/029690
PCT Pub. Date: Mar. 13, 2008

(65) Prior Publication Data
US 2010/0016471 A1 Jan. 21, 2010

(30) Foreign Application Priority Data

Sep. 4, 2006 (JP) ................................ 2006-239206

(51) Int. Cl.
| | |
|---|---|
| *B29C 33/60* | (2006.01) |
| *B32B 7/12* | (2006.01) |
| *B60C 1/00* | (2006.01) |
| *C04B 24/22* | (2006.01) |
| *C08G 73/10* | (2006.01) |
| *C08J 3/00* | (2006.01) |
| *C08K 3/04* | (2006.01) |
| *C08K 5/00* | (2006.01) |
| *C08K 5/06* | (2006.01) |
| *C08K 5/16* | (2006.01) |
| *C08K 5/51* | (2006.01) |
| *C08K 5/52* | (2006.01) |
| *C09D 5/00* | (2006.01) |
| *C09D 11/02* | (2006.01) |
| *C09D 11/10* | (2006.01) |
| *C09D 13/00* | (2006.01) |
| *C09K 3/00* | (2006.01) |
| *D06P 1/52* | (2006.01) |

(52) U.S. Cl. .................. 523/164; 106/31.01; 106/31.07; 524/136; 524/140; 524/186; 524/236; 524/247; 524/251; 524/372; 524/376; 524/377; 524/495; 524/496

(58) Field of Classification Search ............... 106/31.01, 106/31.07; 523/164; 524/495, 496, 136, 524/140, 186, 236, 247, 251, 372, 376, 377
See application file for complete search history.

(56) References Cited

U.S. PATENT DOCUMENTS

| 4,212,786 A | * | 7/1980 | Murakami | ................... 523/164 |
| 6,702,884 B2 | * | 3/2004 | Brown | ...................... 106/31.61 |

FOREIGN PATENT DOCUMENTS

| JP | 54-23619 B | 8/1979 |
| JP | 8-120209 A | 5/1996 |
| JP | 8-245916 A | 9/1996 |
| JP | 2001-254043 A | 9/2001 |
| JP | 2004-352741 A | 12/2004 |
| JP | 2004-240030 A | 9/2005 |
| JP | 2006-57083 A | 3/2006 |
| WO | WO 2006/093248 A1 | 9/2006 |

OTHER PUBLICATIONS

International Search Report of PCT/JP2007/066770, dated Nov. 6, 2007.

* cited by examiner

*Primary Examiner* — Patrick Niland
(74) *Attorney, Agent, or Firm* — Hamre, Schumann, Mueller & Larson, P.C.

(57) ABSTRACT

The invention provides a process for producing a crayon having a desired hardness stably without poor gelation using a benzylidene sorbitol gelling agent together with the use of carbon black as a black pigment.

The process comprises:
dissolving and dispersing a resin component, carbon black having a pH of less than 5.0 and an organic amine in an organic solvent,
dissolving at least one gelling agent selected from the group consisting of dibenzylidene sorbitol, tribenzylidene sorbitol and derivatives thereof in the resultant under heating to prepare a raw material solution,
pouring the raw material solution into a molding container, and
cooling and gelling the raw material solution.

6 Claims, No Drawings

CRAYON AND PROCESS FOR PRODUCING THE SAME

TECHNICAL FIELD

The present invention relates to a crayon and a process for producing the same. More particularly, the invention relates to a process for stably producing a crayon having a desired hardness without poor gelation using a benzylidene sorbitol gelling agent together with the use of carbon black as a black pigment, and a crayon obtained by such a process for production.

BACKGROUND ART

A crayon containing a colorant, an organic solvent, a resin and a gelling agent as main components has been conventionally well known, and in particular, a crayon obtained by using a benzylidene sorbitol gelling agent is in wide use as it is practically excellent. Such a crayon that is obtained by using a benzylidene sorbitol gelling agent is prepared by a process, for example, which involves adding a resin component and a coloring agent to an appropriate organic solvent and dissolving or dispersing them therein to prepare a solution, adding thereto a benzylidene sorbitol gelling agent and dissolving it therein under heating to prepare a raw material solution, pouring the solution into a cylindrical molding container, for example, and then cooling and gelling (solidifying) the same (see Patent Literature 1).

In such a process for producing a crayon as mentioned above, when carbon black is used as a coloring agent, poor gelation frequently occurs in a final gelling process, resulting in that a crayon cannot be stably produced. More specifically, carbon black and a resin component are dispersed and dissolved, respectively, in an organic solvent, a benzylidene sorbitol gelling agent is dissolved in the resultant solution under heating to prepare a raw material solution, the raw material solution is poured into a molding container, depending on the case, while continuously heating the raw material solution so that the gelling agent remains dissolved in the raw material solution, and when the solution is cooled and solidified, it frequently happens that the gelling agent does not function, resulting in poor gelation.

When poor gelation occurs on the occasion of pouring the obtained raw material solution into a molding container, the crayon obtained does not have a desired hardness. Accordingly, the crayon is easy to collapse in writing, resulting in difficulty of writing. Depending on the case, the raw material solution does not gel, and thus a crayon cannot be obtained.
Patent Literature 1: Japanese Patent Publication No. 54-23619

DISCLOSURE OF THE INVENTION

Technical Problems to be Solved

The invention has been made to solve the above-described problems involved in producing a crayon using a benzylidene sorbitol gelling agent together with the use of carbon black as a black pigment. Therefore, it is an object of the invention to provide a process for stably producing a crayon having a desired hardness without poor gelation.

Means to Solve the Problems

The invention provides a process for producing a crayon comprising dissolving and dispersing a resin component, carbon black having a pH of less than 5.0 and an organic amine in an organic solvent, and then dissolving at least one gelling agent selected from the group consisting of dibenzylidene sorbitol, tribenzylidene sorbitol and derivatives thereof in the resultant under heating thereby preparing a raw material solution, pouring the raw material solution into a molding container, and cooling and solidifying the raw material solution.

The invention further provides a crayon which is obtainable by dissolving and dispersing a resin component, carbon black having a pH of less than 5.0 and an organic amine in an organic solvent, and then dissolving at least one gelling agent selected from the group consisting of dibenzylidene sorbitol, tribenzylidene sorbitol and derivatives thereof in the resultant under heating thereby preparing a raw material solution, pouring the raw material solution into a molding container, and cooling and solidifying the raw material solution.

Effect of the Invention

According to the invention, a resin component, carbon black having a pH of less than 5.0 and an organic amine are dissolved and dispersed in an organic solvent, and then at least one gelling agent selected from the group consisting of dibenzylidene sorbitol, tribenzylidene sorbitol and derivatives thereof is dissolved in the resultant under heating thereby a raw material solution is prepared, the raw material solution is poured into a molding container, and cooled and solidified, thereby it is possible to stably produce a crayon having a desired hardness without poor gelation of the raw material solution.

BEST MODE FOR CARRYING OUT THE INVENTION

The process for producing a crayon according to the invention comprises dissolving and dispersing a resin component, carbon black having a pH of less than 5.0 and an organic amine in an organic solvent, and then dissolving at least one gelling agent selected from the group consisting of dibenzylidene sorbitol, tribenzylidene sorbitol and derivatives thereof in the resultant under heating thereby preparing a raw material solution, pouring the raw material solution into a molding container, and cooling and solidifying the raw material solution.

In the process for production of a crayon of the invention, the organic solvent used is not particularly limited, and at least one selected from the group consisting of alcohols, glycols, glycol ethers, and glycol ether esters is preferably used. Specific examples of such a preferable organic solvent include: alcohols, such as methanol, ethanol, isopropyl alcohol, 3-methyl-3-methoxybutanol, and 3-methoxy-1-butanol; glycols, such as ethylene glycol, propylene glycol, diethylene glycol, and dipropylene glycol; glycol ethers, such as methyl ether, ethyl ether, propyl ether, butyl ether, and phenyl ether of the above-mentioned glycols; and glycol ether esters such as acetates of the above-mentioned glycol ethers.

Among the above, at least one selected from the group consisting of 3-methyl-3-methoxybutanol, ethylene glycol monobutyl ether, propylene glycol monomethyl ether, propylene glycol monopropyl ether, propylene glycol monobutyl ether, and dipropylene glycol monomethyl ether is particularly preferably used.

The amount of the organic solvent used is suitably determined depending on the other components, such as a colorant. The organic solvent is used usually in an amount of from 20 to 80% by weight, and preferably 30 to 65% by weight, based on the weight of crayon. When the amount of the organic solvent is excessively large, there is a possibility that it becomes difficult to integrally gel the necessary components. On the other hand, when the amount of the organic solvent is excessively small, it becomes difficult to dissolve the necessary components, resulting in a possibility that a uniform gel cannot be formed.

The resin component has generally a function of integrating the components, as well as a function as a fixing agent for writing formed when writing is performed on a writing surface with the crayon obtained. In the process for production of the crayon according to the invention, a film forming resin and an adhesive resin are preferably used in combination as such a resin component.

In more detail, the film forming resin is intended to increase hardness of the crayon obtained and strengthen writing formed on a writing surface, and is not particularly limited insofar as such functions are given. In particular, cellulosic resin, such as cellulose acetate butyrate, ethyl cellulose and acetyl cellulose; vinyl resins, such as polyvinyl butyral resin, polyvinyl acetate resin, vinyl acetate-vinyl chloride copolymer resin, and vinyl acetate-ethylene copolymer resin; and the like, are preferably used. These film forming resins may be used singly or in combination of two or more.

On the other hand, the adhesive resin is intended to increase adhesion of writing formed with the crayon obtained to a writing surface, and is not particularly limited insofar as such functions are given. In general, ketone resin, xylene resin, polyamide resin, acrylic resin, maleic resin, terpene phenolic resin, alkylphenolic resin, and the like, are used. Furthermore, rosin ester and hydrogenated rosin ester are also used similarly as the adhesive resin. Examples of ketone resin include a condensate of cyclohexane and formaldehyde. Examples of xylene resin include a condensate of m-xylene and formaldehyde. Examples of polyamide resin include thermoplastic resin obtained by condensation polymerization of dimer acid and diamine or polyamine and having a molecular weight of about 4,000 to 9,000. Examples of acrylic resin include thermoplastic polyacrylic acid ester. These adhesive resins may also be used singly or in combination of two or more.

According to the invention, the ratio of the film forming resin and the adhesive resin is suitably determined depending on the other components. The weight ratio of the film forming resin: the adhesive resin is generally about 1:0.1 to 5, and preferably about 1:0.2 to 3. Further, the film forming resin and the adhesive resin are used in all usually in an amount of from 3 to 40% by weight, preferably from 6 to 35% by weight, based on the weight of crayon. When the amount of the resin component is excessively large, the hardness of the crayon obtained is excessively high and colorability and leveling properties are poor. On the contrary, when the amount of the resin component is excessively small, it becomes difficult to integrally gel the components in the production of crayon and the crayon obtained has no sufficient fixability and strength.

The gelling agent is a component for integrating the components into a solid. As such a gelling agent, at least one selected from the group consisting of dibenzylidene sorbitol, tribenzylidene sorbitol and derivatives thereof is preferably used.

Examples of derivatives of dibenzylidene sorbitol include compounds in which a benzene nucleus in a benzylidene group of dibenzylidene sorbitol is substituted with an alkyl group having 1 to 3 carbon atoms or a halogen atom at an arbitrary position. Specific examples thereof include [di(p-methylbenzylidene)]sorbitol, [di(m-ethylbenzylidene)]sorbitol, and [di(p-chlorobenzylidene)]sorbitol.

Examples of derivatives of tribenzylidene sorbitol include compounds in which a benzene nucleus in a benzylidene group of tribenzylidene sorbitol is substituted with an alkyl group having 1 to 3 carbon atoms or a halogen atom at an arbitrary position. Specific examples thereof include [tri(p-methylbenzylidene)]sorbitol, [tri(m-ethylbenzylidene)]sorbitol, and [tri(p-chlorobenzylidene)]sorbitol. The above-mentioned gelling agents can be used singly or in combination of two or more.

In the process for production of crayon according to the invention, the carbon black used should have a pH of less than 5.0. However, the carbon black may have a pH of less than 5.0 alone, or the carbon black may have a pH of less than 5.0 as a mixture of two or more. Therefore, for example, a mixture composed of a first carbon black having a pH of les than 5.0 and a second carbon black having a pH of not less than 5.0 and yet having a pH of less than 5.0 can be used as the carbon black.

The crayon of the invention may contain a third coloring agent that is substantially neutral may be used together with the carbon black. Such third coloring agent include, for example, a phthalocyanine pigment such as copper phthalocyanine blue, an indanthrene pigment, an azo pigment, a quinacridone pigment, an anthraquinone pigment, a dioxazine pigment, an indigo pigment, a thioindigo pigment, a perinone pigment, a perylene pigment, an indolenone pigment, and an azo-azomethine pigment, and, in addition thereto, titanium oxide and carbon black. Furthermore, as required, an inorganic pigment, such as iron oxide, red iron oxide, chromium oxide, calcium carbonate, clay, and talc, a fluorescent pigment, colored resin particles, a metallic flake pigment, such as aluminum powder, a so-called pearl pigment, etc., are used. Moreover, various extender pigments are also used as required. However, the third coloring agent usable is not limited to the above.

The carbon black is used in the range of from 2-50% by weight based on the weight of crayon. When the amount of the carbon black in the crayon is less than 2% by weight, the crayon obtained may make no sufficient color development. However, when the amount of carbon black exceeds 50% by weight, the relative proportions of the other components other than the carbon black are excessively low in the crayon obtained, and thus the functions of the components are not fully demonstrated, thereby failing to provide the crayon of the invention excellent in performance. Moreover, in the production of crayon, the viscosity of the raw material solution mentioned hereinbefore is excessively high, which makes it difficult to pour the solution into a molding container.

The preferred amount of carbon black in the crayon varies depending on the type of carbon black used, and is usually in the range of from 3-40% by weight, and most preferably in the range of from 4-10% by weight based on the weight of crayon.

When a raw material solution is prepared using carbon black having a pH of less than 5.0, the resulting raw material solution has a tendency towards poor gelation when it is cooled. According to the invention, because the raw material solution is prepared using carbon black having a pH of less than 5.0 together with an organic amine, it is gelled without poor gelation, thereby a crayon having a desired hardness is stably produced.

The organic amine used in the invention is preferably an alkylamine or an alkanolamine. The alkylamine used includes, for example, diethylamine, triethylamine, etc., and the alkanolamine used includes, for example, monoethanolamine, diethanolamine, triethanolamine, monopropanolamine, dipropanolamine, tripropanolamine, etc. Among these is preferred an alkanolamine, and in particular, diethanolamine and triethanolamine are preferably used.

The organic amine is used usually in an amount of 0.02-1.0%, preferably in an amount of 0.05-0.5% by weight based on the crayon. When the amount of organic amine is less than 0.02% by weight based on the crayon, the resulting raw material solution tends towards poor gelation when it is cooled. On the other hand, when the amount of organic amine is more than 1.0% by weight based on the crayon, the resulting crayon has a tendency to provide writing having reduced water resistance.

The raw material solution is prevented from poor gelation by using carbon black having a pH of less than 5.0 in combination with the organic amine. Accordingly, also when an acidic surfactant is used as a component of crayon in addition to those mentioned above, poor gelation of a raw material solution is prevented, and the crayon having a desired hardness can be manufactured in the same manner.

The acidic surfactant is such that it is acidic on account of acidic hydroxyl group that it has, and examples include, for example, at least one selected from polyoxyethylene alkyl ether phosphoric acid ester and polyoxyethylene alkyl phenyl ether phosphoric acid ester. These polyoxyethylene alkyl ether phosphoric acid ester and polyoxyethylene alkyl phenyl ether phosphoric acid ester have usually a pH of 2.5 or less when measured as a 10% aqueous solution (JIS Z 8802).

According to the invention, it is preferred to use such a surfactant so that writing formed on the surface of glass is not gotten blurred or is not carried away by rain when it is wetted with rain. In particular, a surfactant having an HLB (Hydrophile-Lipophile Balance) value of not more than 9.0, and preferably in the range of 5.0-9.0 is preferred.

Such polyoxyethylene alkyl ether phosphoric acid ester and polyoxyethylene alkyl phenyl ether phosphoric acid ester as mentioned above can be commercially available as, for example, Phosphanol RL-210 (having an HLB value of 5.4), Phosphanol RM-410 (having an HLB value of 5.8), Phosphanol GB-520 (having an HLB value of 6.9), Phosphanol RB-410 (having an HLB value of 8.6) and Phosphanol RS-410 (having an HLB value of 9.0), (each available from Toho Chemical Industry Co., Ltd.) among others.

Organic phosphates are in general divided into three groups, that is, mono- di- and triesters, as well known. The above-mentioned polyoxyethylene alkyl ether phosphoric acid ester and polyoxyethylene alkyl phenyl ether are also mixtures of mono- and diesters with a small amount of triesters.

The crayon of the invention may contain such a surfactant in an amount of 0.1-5% by weight based on the crayon. When the amount of surfactant is less than 0.1% by weight of the crayon, the writing formed on the surface of glass has not sufficient resistance to water, whereas when the amount of surfactant is more than 5% by weight of the crayon, there is a possibility that the raw material solution gels poorly and it is difficult to gel the components described hereinabove integrally to solid.

The surfactant having an HLB value within the range mentioned above may be used alone. On the other hand, since HLB value has additive property, two or more surfactants may be used in combination while the resulting HLB value is appropriately adjusted. Even if a surfactant has an HLB value of more than 9.0, it can be used in combination with another surfactant having a smaller HLB value, so far as the resulting mixture has an HLB value of not more than 9.0

The crayon of the invention, in addition to the above-mentioned components, may contain other components which are conventionally known as additives in a crayon, such as a surfactant, a plasticizer, an anticorrosive agent, a filler, a leveling agent, a viscosity controlling agent, a structural viscosity imparting agent, and a dryness imparting agent, as required. There may be mentioned as preferred plasticizers, for example, diethyl phthalate, dibutyl phthalate, dioctyl phthalate, butyl benzyl phthalate, 2-ethylhexyl epoxyhexahydrophthalate, 2-ethylhexyl sebacate, and tricresyl phosphate. Such a plasticizer is used to provide flexibility with writing formed with the crayon.

The crayon of the invention is produced preferably as follows using the above-mentioned components. More specifically, carbon black having a pH of less than 5.0 and, if necessary, a third coloring agent are added to an organic solvent, if needed, under heating, and the resultant is stirred to disperse the carbon black therein, and then the resin component and the organic amine, and if necessary, other components are added to and dissolved in the resultant. The gelling agent is added to and dissolved in the resulting solution while the solution is heated, thereby to obtain a raw material solution. Then, the raw material solution is poured into a molding container having a desired shape, if required, while heating the raw material solution so that the gelling agent remains dissolved therein, and then the raw material solution is cooled and gelled, thereby stably providing the crayon of the invention having the desired shape and hardness. It is not specifically limited when the organic amine is added, so far as it is added before the gelling agent is added.

The hardness of the crayon obtained in this way according to the invention can be suitably adjusted depending on the type and proportion of the organic solvent, the gelling agent, the resin, etc. used, and is suitably determined according to the intended use, and is generally from about 5-50 kg/cm$^2$, and preferably from 7-30 kg/cm$^2$.

EXAMPLES

The invention will be described with reference to the following examples and comparative examples, but the invention is not limited thereto. In the following, pH of carbon black (mixture) was measured according to the method of testing of pigment (pH value) provided in JIS K 5101.

Example 1

5.0 parts by weight of carbon black (Special Black 100 manufactured by Degussa and having a pH of 3.3) was added to and dispersed in a mixed solvent composed of 11.0 parts by weight of ethylene glycol monobutyl ether, 19.0 parts by weight of propylene glycol n-butyl ether and 19.2 parts by weight of dipropylene glycol monomethyl ether while the mixed solvent was heated at a temperature of 30° C.

Then, 13.0 parts by weight of polyvinyl butyral resin (MOWITAL B-20H, manufactured by Kuraray Co., Ltd., and having an average degree of polymerization of about 300), 6.0 parts by weight of polyvinyl butyral resin (MOWITAL B-30H, manufactured by Kuraray Co., Ltd., and having an average degree of polymerization of about 500), 12.0 parts by weight of ketone resin ("Highlack 111" manufactured by Hitachi Chemical Co., Ltd.) and 3.0 parts by weight of poyamide resin ("Versamide 335" manufactured by Henkel Hakusui Corporation) were added to and dissolved in the resulting dispersion of carbon black at a temperature of 30° C.

Then, 5.0 parts by weight of butylbenzyl phthalate, 0.5 parts by weight of a surfactant (Phosphanol RM-410) and 0.3 parts by weight of diethanolanmine were added to and dissolved in the solution having the carbon black and the resin component dissolved and dispersed therein at a temperature of 30° C.

6.0 parts by weight of dibenzylidene sorbitol ("GELOL D", a gelling agent manufactured by New Japan Chemical Co., Ltd.) was added to and dissolved in the thus obtained solution containing the resin and the carbon black while heating the solution at a temperature of 130° C., thereby a raw material solution was obtained. The raw material solution was poured into a cylindrical molding container, and was cooled to room temperature and gelled and solidified. The solidified substance was taken out as a crayon from the container.

Examples 2 and 3

A crayon was obtained in the same manner as in Example 1, except using the components shown in Table 1 in the amounts shown in Table 1.

Comparative Examples 1 and 2

A crayon was obtained in the same manner as in Example 1, except using the components shown in Table 1 in the amounts shown in Table 1.

When each crayon was produced as described above, the degree of gelation of the raw material solutions was visually observed after 1 hour and 3 hours, respectively, from the point of time dibenzylidene sorbitol was added to the solution containing the resin and the carbon black, and then the solution was cooled to room temperature. The case where the raw material solution was gelled smoothly and the obtained crayon had an expected hardness was defined as A, the case where the raw material solution was gelled insufficiently and the obtained crayon was a little excessively soft was defined as B, and the case where the raw material solution was not gelled and crayon was not obtained was defined as C. The results are shown in Table 1.

TABLE 1

|  | Examples | | | Comparative | |
| --- | --- | --- | --- | --- | --- |
|  | 1 | 2 | 3 | 1 | 2 |
| Solvent: | | | | | |
| Ethylene glycol monobutyl ether | 11.0 | 8.0 | 12.0 | 12.0 | 10.0 |
| Propylene glycol mono-n-butyl ether | 19.0 | 17.0 | 18.0 | 18.0 | 20.0 |
| Dipropylene glycol monomethyl ether | 19.2 | 29.9 | 20.8 | 20.0 | 19.0 |
| Coloring Agent: Special Black 100 (having a pH of 3.3) | 5.0 | 5.0 | 5.0 | 5.0 | 5.0 |
| Organic Amine: | | | | | |
| Triethanolamine |  | 0.1 |  |  | 0.01 |
| Diethanolamine | 0.3 |  |  |  |  |
| Diethylamine |  |  | 0.2 |  |  |
| Resin Component: | | | | | |
| Polyvinyl butyral resin (having an average degree of polymerization of about 300) | 13.0 | 12.0 | 20.0 | 13.0 | 15.5 |
| Polyvinyl butyral resin (having an average degree of polymerization of about 500) | 6.0 | 6.0 |  | 6.0 | 3.0 |
| Ketone resin | 12.0 | 9.0 | 15.0 | 15.0 | 11.0 |
| Polyamide resin | 3.0 | 6.0 |  |  | 4.0 |
| Gelling Agent | 6.0 | 7.0 | 6.0 | 7.0 | 6.5 |
| Butylbenzyl Phthalate (Plasticizer) | 5.0 |  | 3.0 | 4.0 | 4.0 |
| Phosphanol RM-410 (Surfactant) | 0.5 |  |  |  | 2.0 |
| Degree of Gellation | | | | | |
| After 1 hour | A | A | A | C | B |
| After 3 hours | A | A | A | C | C |

The invention claimed is:

1. A process for production of a crayon, comprising:
   dissolving and dispersing in an organic solvent, a resin component, carbon black having a pH of less than 5.0, and an organic amine,
   wherein the organic amine is at least one amine selected from the group consisting of alkylamine and alkanolamine;
   dissolving in a resultant of the dissolving and dispersing step, at least one gelling agent selected from the group consisting of dibenzylidene sorbitol, tribenzylidene sorbitol, and derivatives thereof, under heating so as to prepare a raw material solution;
   pouring the raw material solution into a molding container; and
   cooling and gelling the raw material solution.

2. The process for production of a crayon according to claim 1, wherein in addition to the resin component, the carbon black having a pH of less than 5.0, and the organic amine, an acidic surfactant is dissolved in the organic solvent.

3. The process for production of a crayon according to claim 2, wherein the acidic surfactant is at least one material selected from the group consisting of polyoxyethylene alkyl ether phosphoric acid ester and polyoxyethylene alkyl phenyl ether phosphoric acid ester.

4. A crayon obtainable by a process that comprises:
   dissolving and dispersing in an organic solvent, a resin component, carbon black having a pH of less than 5.0, and an organic amine,
   wherein the organic amine is at least one amine selected from the group consisting of alkylamine and alkanolamine;
   dissolving in a resultant of the dissolving and dispersing step, at least one gelling agent selected from the group consisting of dibenzylidene sorbitol, tribenzylidene sorbitol, and derivatives thereof, under heating so as to prepare a raw material solution;

pouring the raw material solution into a molding container; and cooling and gelling the raw material solution.

5. The crayon according to claim 4, wherein in addition to the resin component, the carbon black having a pH of less than 5.0, and the organic amine, an acidic surfactant is dissolved in the organic solvent.

6. The crayon according to claim 5, wherein the acidic surfactant is at least one material selected from the group consisting of polyoxyethylene alkyl ether phosphoric acid ester and polyoxyethylene alkyl phenyl ether phosphoric acid ester.

* * * * *